US012699412B2

(12) United States Patent
Iwamoto

(10) Patent No.: US 12,699,412 B2
(45) Date of Patent: Aug. 4, 2026

(54) REFERENCE VOLTAGE CIRCUIT AND ELECTRONIC CIRCUIT

(71) Applicant: FUJI ELECTRIC CO., LTD., Kawasaki (JP)

(72) Inventor: Motomitsu Iwamoto, Matsumoto-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 192 days.

(21) Appl. No.: 18/676,236

(22) Filed: May 28, 2024

(65) Prior Publication Data

US 2025/0044822 A1 Feb. 6, 2025

(30) Foreign Application Priority Data

Jul. 31, 2023 (JP) ................................. 2023-124112

(51) Int. Cl.
 *G05F 3/30* (2006.01)
 *G01L 9/02* (2006.01)
 *G05F 1/46* (2006.01)
 *G05F 3/22* (2006.01)

(52) U.S. Cl.
 CPC ................... *G05F 3/30* (2013.01); *G01L 9/02* (2013.01); *G05F 1/468* (2013.01); *G05F 3/222* (2013.01); *G05F 3/22* (2013.01)

(58) Field of Classification Search
 CPC ............... G05F 3/22; G05F 3/222; G05F 3/30
 See application file for complete search history.

(56) References Cited

U.S. PATENT DOCUMENTS

| | | | | | |
|---|---|---|---|---|---|
| 6,462,612 | B1 * | 10/2002 | Roh | ......................... | G05F 3/30 |
| | | | | | 327/539 |
| 8,461,912 | B1 * | 6/2013 | Kumar | ...................... | G05F 3/30 |
| | | | | | 327/539 |
| 12,058,972 | B2 * | 8/2024 | Kovach | .................... | A01H 5/10 |
| 2011/0102058 | A1 * | 5/2011 | Conte | ................. | H03F 3/45183 |
| | | | | | 330/296 |
| 2011/0227636 | A1 | 9/2011 | Endo et al. | | |
| 2012/0212194 | A1 | 8/2012 | Tachibana et al. | | |

(Continued)

FOREIGN PATENT DOCUMENTS

| | | | |
|---|---|---|---|
| JP | 2011-081517 | A | 4/2011 |
| JP | 2011-198093 | A | 10/2011 |
| JP | 2012-174085 | A | 9/2012 |

*Primary Examiner* — Gary L Laxton
(74) *Attorney, Agent, or Firm* — Rabin & Berdo, P.C.

(57) ABSTRACT

A reference voltage circuit includes: a first resistor and a first pn junction device connected in series, and a second resistor, a third resistor, and a second pn junction device connected in series, both between a predetermined line and a ground; a first capacitor and a second capacitor; a voltage output circuit configured to amplify a first voltage at a first node between the first resistor and the first pn junction device, and amplify a second voltage at a second node between the second resistor and the third resistor, for a first time period and a second time period to thereby output a resultant voltage to the first capacitor and the second capacitor, respectively; and an amplifier circuit configured to amplify a difference between voltages at the first and second capacitors. A reference voltage corresponding to a voltage from the first amplifier circuit is applied to the predetermined line.

9 Claims, 12 Drawing Sheets

(56)                     References Cited

U.S. PATENT DOCUMENTS

2013/0293289 A1*  11/2013  Ivanov ................... G05F 3/205
                                                        327/539
2019/0163224 A1*   5/2019  Horng ..................... G05F 3/267
2019/0187734 A1*   6/2019  Kim .................... H03F 3/45475

* cited by examiner

|  | REFERENCE VOLTAGE CIRCUIT 500 | REFERENCE VOLTAGE CIRCUIT 21 |
|---|---|---|
| WITHOUT OFFSET VOLTAGE (Voff1=0V) | 1.188V | 1.188V |
| WITH OFFSET VOLTAGE (Voff1=10mV) | 1.311V | 1.213V |
| ERROR CAUSED BY OFFSET VOLTAGE | 123mV | 25mV |

FIG. 8

REFERENCE VOLTAGE CIRCUIT AND ELECTRONIC CIRCUIT

CROSS-REFERENCE TO RELATED APPLICATIONS

The present application claims priority pursuant to 35 U.S.C. § 119 from Japanese patent application number 2023-124112 filed on Jul. 31, 2023, the entire disclosure of which is hereby incorporated by reference herein.

BACKGROUND

Technical Field

The present disclosure relates to a reference voltage circuit and an electronic circuit.

Description of the Related Art

For example, there are reference voltage circuits configured to output a bandgap voltage (for example, Japanese Patent Application Publication Nos. 2012-174085, 2011-198093, and 2011-081517).

Such a reference voltage circuit as described above generally uses an operational amplifier to output the bandgap voltage.

However, in the reference voltage circuit using the operational amplifier, an error that occurs in the bandgap voltage is large due to the effect of the offset voltage of the operational amplifier.

SUMMARY

An aspect of the present disclosure is a reference voltage circuit for generating a reference voltage, comprising: a predetermined line; a first resistor and a first pn junction device that are provided between the predetermined line and a ground, the first pn junction device being connected in series with the first resistor; a second resistor, a third resistor, and a second pn junction device that are provided between the predetermined line and the ground, the third resistor being connected in series with the second resistor, the second pn junction device being connected in series with the third resistor; a first capacitor and a second capacitor; a voltage output circuit configured to operate repeatedly with a predetermined frequency, which corresponds to a predetermined period that includes a first time period and a second time period, by amplifying a first voltage at a first node, at which the first resistor and the first pn junction device are connected, for the first time period, to thereby output a first resultant voltage to the first capacitor, and amplifying a second voltage at a second node, at which the second resistor and the third resistor are connected, for the second time period, to thereby output a second resultant voltage to the second capacitor; and a first amplifier circuit configured to amplify a difference between a voltage at the first capacitor and a voltage at the second capacitor, wherein the reference voltage is generated corresponding to a voltage outputted by the first amplifier circuit, and is applied to the predetermined line.

BRIEF DESCRIPTION OF THE DRAWINGS

FIG. 4 is a diagram illustrating a configuration example of a voltage output circuit 30a.

FIG. 8 is a table for comparing reference voltages Vbgr between reference voltage circuits 500 and 21.

DETAILED DESCRIPTION

Figure 1:
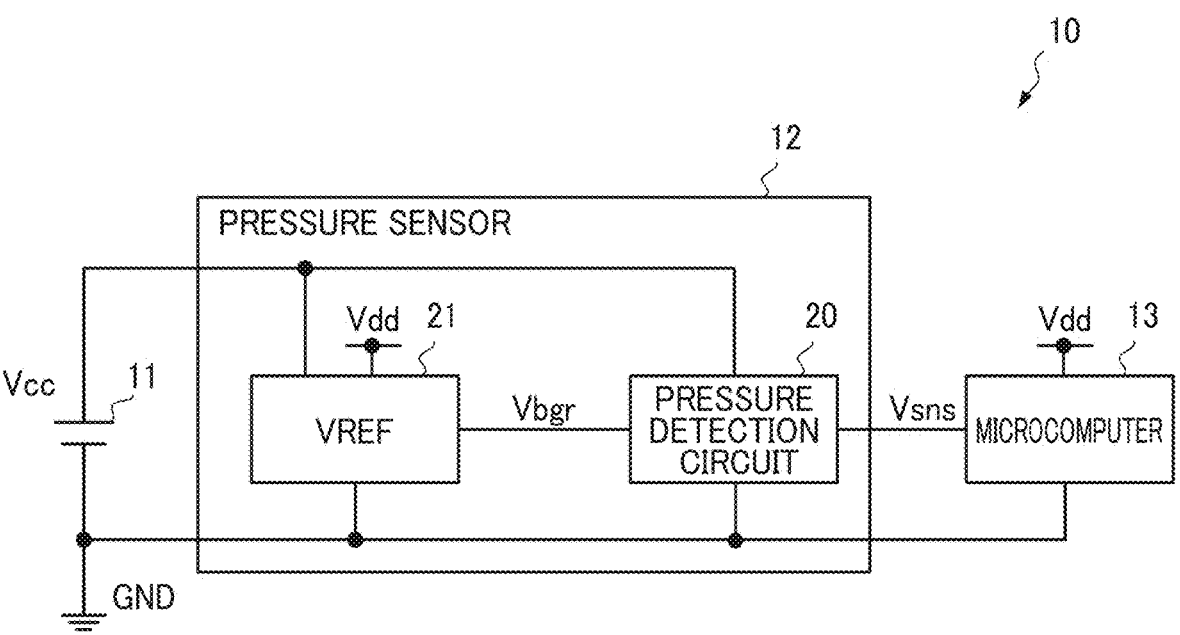
FIG. 1 is a diagram illustrating a configuration example of an electronic circuit 10.

At least following matters will become apparent from the descriptions of the present description and the accompanying drawings. Hereinafter, embodiments of the present disclosure will be described with reference to the drawings. The same or equivalent constituent elements, members, and the like illustrated in the drawings are given the same reference numerals, and repetitive description is omitted as appropriate.

Embodiments

<<<Overview of Electronic Circuit 10>>>

FIG. 1 is a diagram illustrating a configuration of an electronic circuit 10 according to an embodiment of the present disclosure. The electronic circuit 10 uses power from a battery 11, for example, to detect the pressure in a cylinder of an internal combustion engine of an automobile, and output a signal to control the internal combustion engine. The electronic circuit 10 includes a pressure sensor 12 and a microcomputer 13. Note that the battery 11 is, for example, a lithium-ion battery for automobiles, and outputs a power supply voltage Vcc of 12 V.

The pressure sensor 12 detects the pressure in the cylinder, and includes a pressure detection circuit 20 and a reference voltage circuit 21. The pressure detection circuit 20 includes a sensor that detects a pressure using a Wheatstone bridge circuit, for example. Further, the pressure detection circuit 20 operates based on a reference voltage Vbgr from the reference voltage and outputs a result of detection to the microcomputer 13 as a voltage Vsns. The reference voltage circuit 21 outputs a bandgap voltage as the reference voltage Vbgr. Note that the pressure detection circuit 20 is supplied with a power supply voltage Vcc, and the reference voltage circuit 21 is supplied with a voltage Vdd which is generated by a regulator (not illustrated) together with the power supply voltage Vcc.

The microcomputer 13 outputs a signal (not illustrated) to control the internal combustion engine, based on the voltage Vsns from the pressure sensor 12. Note that the voltage Vdd is supplied to the microcomputer 13 as a power supply voltage.

3

====Configuration of Typical Reference Voltage Circuit 500===

Figure 2:
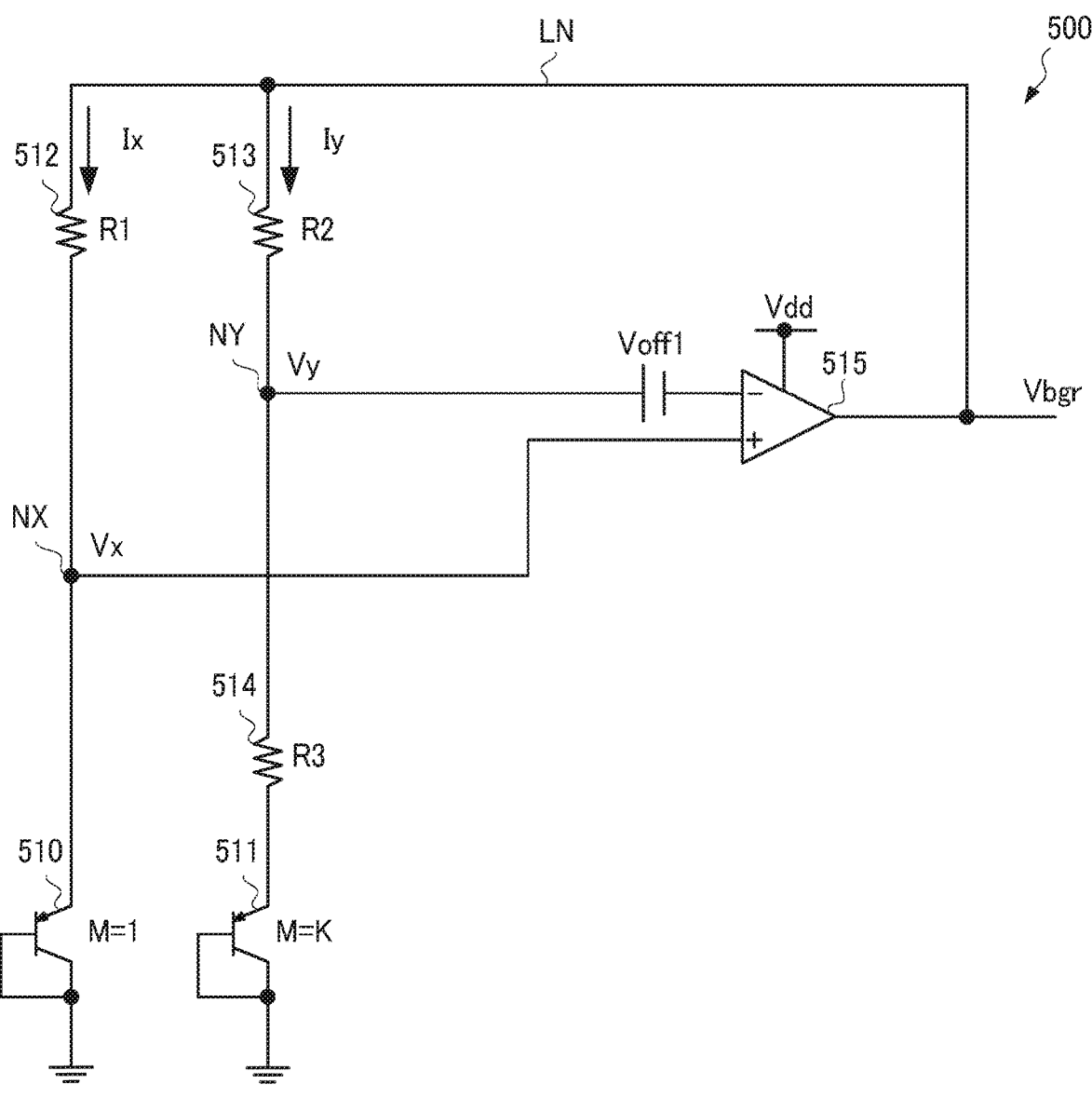
FIG. 2 is a diagram illustrating a configuration example of a typical reference voltage circuit 500.

FIG. 2 is a diagram illustrating a configuration example of a typical reference voltage circuit 500. The reference voltage circuit 500, as with the reference voltage circuit 21, outputs a bandgap voltage as the reference voltage Vbgr. The reference voltage circuit 500 includes PNP transistors 510 and 511, resistors 512 to 514, and an operational amplifier 515.

The PNP transistor 510 is configured to operate as a diode, and outputs a voltage Vbe0 from its emitter electrode in response to current flowing. Specifically, the PNP transistor 510 is connected in series with the resistor 512 that is connected to a line LN, and the base and collector of the PNP transistor 510 are connected and grounded. In this case, the PNP transistor 510 is diode-connected.

Note that a node NX is defined as the connection point between the PNP transistor 510 and the resistor 512, and a voltage Vx is defined as the voltage at the node NX. In this case, the voltage Vx results in the voltage Vbe0. Further, a current Ix is defined as the current flowing through the resistor 512 and the PNP transistor 510. Further, a resistance value R1 is defined as the resistance value of the resistor 512.

The PNP transistor 511 is configured to operate as a diode, and outputs a voltage Vbe1 from its emitter electrode in response to current flowing. Specifically, the PNP transistor 511 is connected in series with the resistor 514 that is connected in series with the resistor 513 that is connected to the line LN, and the base and collector of the PNP transistor 511 are connected and grounded. In this case, the PNP transistor 511 is diode-connected.

Note that a node NY is defined as the connection point between the resistors 513 and 514, and Vy is defined as the voltage at the node NY. Further, a current Iy is defined as the current flowing through the resistors 513 and 514 and the PNP transistor 511. Further, resistance values R2 and R3 are defined as the resistance values of the resistors 513 and 514, respectively. When the PNP transistor 511 is used, the voltage Vy is given as follows.

$$Vy = R3 \times Iy + Vbe1 \qquad \text{Expression (1)}$$

Further, the PNP transistor 511 is configured such that K (for example, 10) PNP transistors having the same characteristics as those of the PNP transistor 510 are connected in parallel. Further, the reference voltage circuit 500 has been described as being configured using the PNP transistors 510 and 511, however, NPN transistors may be used in the same manner.

The operational amplifier 515 amplifies the difference between the voltages Vx and Vy, and applies the reference voltage Vbgr to the line LN. Specifically, the voltage Vx is applied to the non-inverting input of the operational amplifier 515. Meanwhile, the voltage obtained by subtracting an offset voltage Voff1 illustrated in FIG. 2 from the voltage Vy is applied to the inverting input of the operational amplifier 515. Further, the reference voltage Vbgr is outputted from the output of the operational amplifier 515, and the reference voltage Vbgr is applied to the line LN.

With such a configuration, for example, when the reference voltage Vbgr changes to rise higher, the voltage Vy rises, and the voltage Vy that has risen is inputted to the inverting input of the operational amplifier 515, and thus the operational amplifier 515 operates to lower the reference voltage Vbgr. That is, the reference voltage circuit 500 has such a feedback path, and operates to output a constant reference voltage Vbgr. Note that diodes may be used instead of the PNP transistors 510 and 511.

===Operation of Typical Reference Voltage Circuit 500===

<<When Offset Voltage Voff1 is 0 V>>

First, a description will be given of a case where the offset voltage Voff1 is 0 V. In this case, the following expression holds.

$$Vbgr = Vbe1 + VR3 + VR2, \qquad \text{Expression (2)}$$

where voltages VR1 to VR3 are voltages generated at the resistors 512 to 514, respectively.

Since the currents flowing through the resistors 513 and 514 are the same, the following expression holds.

$$VR2 = (R2/R3) \times VR3 \qquad \text{Expression (3)}$$

Accordingly, Expression (2) is transformed as follows.

$$Vbgr = Vbe1 + VR3 \times (R2/R3 + 1) \qquad \text{Expression (4)}$$

Further, when the offset voltage Voff1 is considered, the voltages at the inverting input terminal and the non-inverting input terminal of the ideal operational amplifier 515 are equal to each other due to a virtual short. Thus, Vx=Vy–Voff1 holds, and the following expression holds.

$$Vbe0 = Vbe1 + VR3 - Voff1 \qquad \text{Expression (5)}$$

Accordingly, if ΔVbe=Vbe0–Vbe1, the following expression holds.

$$VR3 = Vbe0 - Vbe1 + Voff1 = \Delta Vbe + Voff1 \qquad \text{Expression (6)}$$

From Expressions (4) and (6), the following expression holds.

$$Vbgr = Vbe1 + \Delta Vbe \times (R2/R3 + 1) + Voff1 \times (R2/R3 + 1) \qquad \text{Expression (7)}$$

In Expression (7), the voltage Vbe1 has negative temperature characteristics of dropping with a rise in temperature, and when Expressions (4) and (7) are compared assuming that the offset voltage Voff1 is 0 V, ΔVbe is equal to the voltage VR3. Further, since the resistance value R3 of the resistor 514 increases with a rise in temperature, the voltage VR3 and ΔVbe have positive temperature characteristics. Accordingly, with the resistance values R2 and R3 of the resistors 513 and 514 being to the set appropriate values, temperature characteristics of the voltage Vbgr can be eliminated, and the reference voltage circuit 500 is able to output the constant reference voltage Vbgr, regardless of change in temperature. Note that when the offset voltage Voff1 is 0 V and in an ideal case, the reference voltage Vbgr does not include an error.

<<When Offset Voltage Voff1 is not 0 V>>

Meanwhile, if the offset voltage Voff1 is not 0 V, an error corresponding to (R2/R3+1) times the offset voltage Voff1 will occur in the reference voltage Vbgr, which is derived from Expression (7).

Accordingly, the following describes the reference voltage circuit 21 capable of reducing the error occurring in the reference voltage Vbgr even when the offset voltage Voff1 is not 0 V, that is, capable of outputting the reference voltage Vbgr with higher accuracy.

=Configuration of Reference Voltage Circuit 21===

Figure 3:
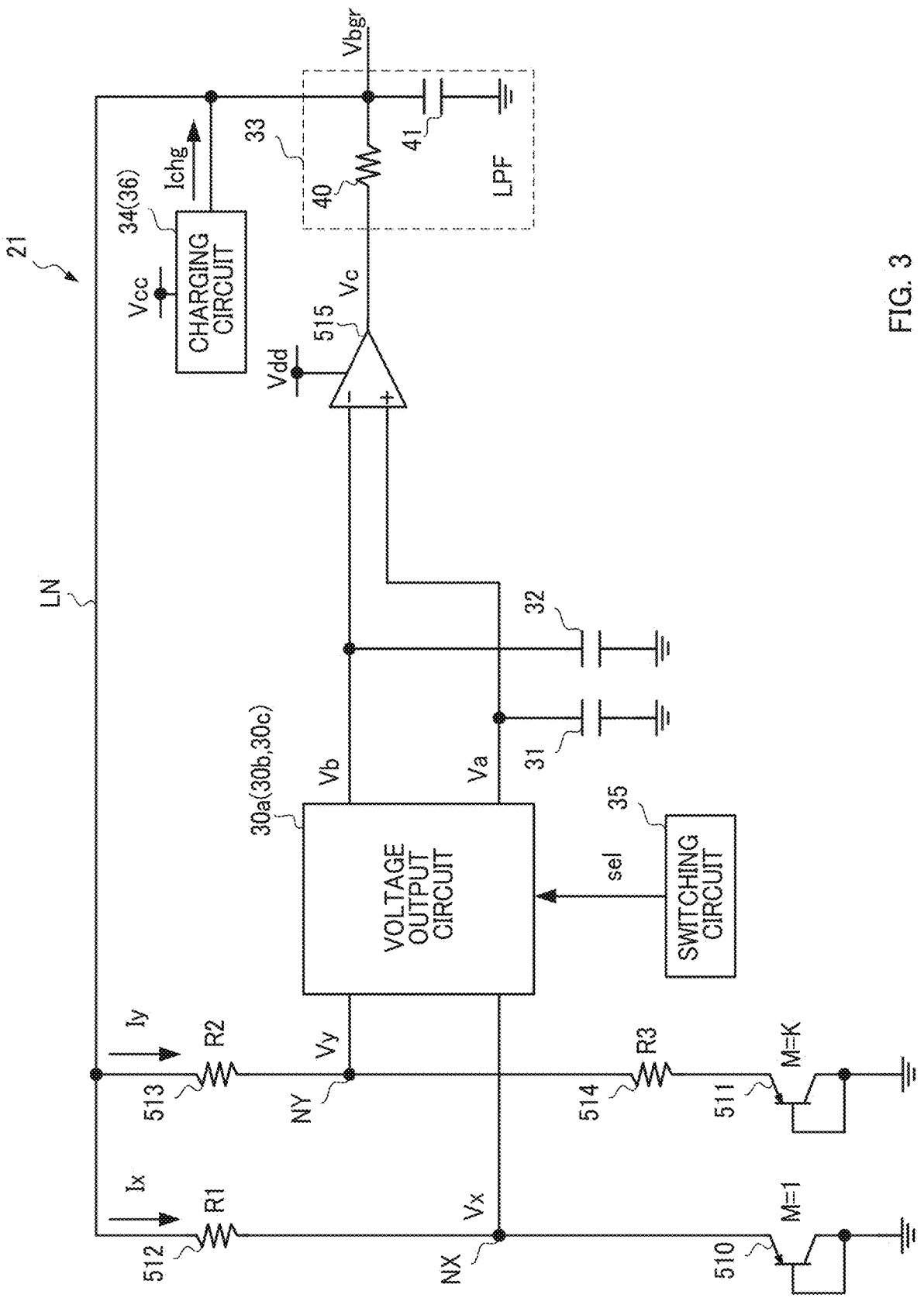
FIG. 3 is a diagram illustrating a configuration example of a reference voltage circuit 21.

FIG. 3 is a diagram illustrating a configuration example of the reference voltage circuit 21. The reference voltage circuit (VREF) 21 outputs the reference voltage Vbgr with less error even when the operational amplifier 515 has the offset voltage Voff1. The reference voltage circuit 21 includes a voltage output circuit 30a, capacitors 31 and 32, a low-pass filter 33, a charging circuit 34, a switching circuit 35, the PNP transistors 510 and 511, the resistors 512 to 514, and the operational amplifier 515. Note that a time period P0 is a time period during which the switching circuit 35 (described later) outputs a low signal sel, and a time period P1 is a time period during which the switching circuit 35 outputs a high signal sel.

Further, the PNP transistor 510 corresponds to a "first pn junction device", the resistor 512 corresponds to a "first resistor," the node NX corresponds to a "first node," and the voltage Vx corresponds to a "first voltage". Further, the PNP transistor 511 corresponds to a "second pn junction device", the resistor 513 corresponds to a "second resistor", the resistor 514 corresponds to a "third resistor", the node NY corresponds to a "second node", and the voltage Vy corresponds to a "second voltage". Further, the line LN corresponds to a "predetermined line".

<<<Voltage Output Circuit 30a>>>

Figure 4:
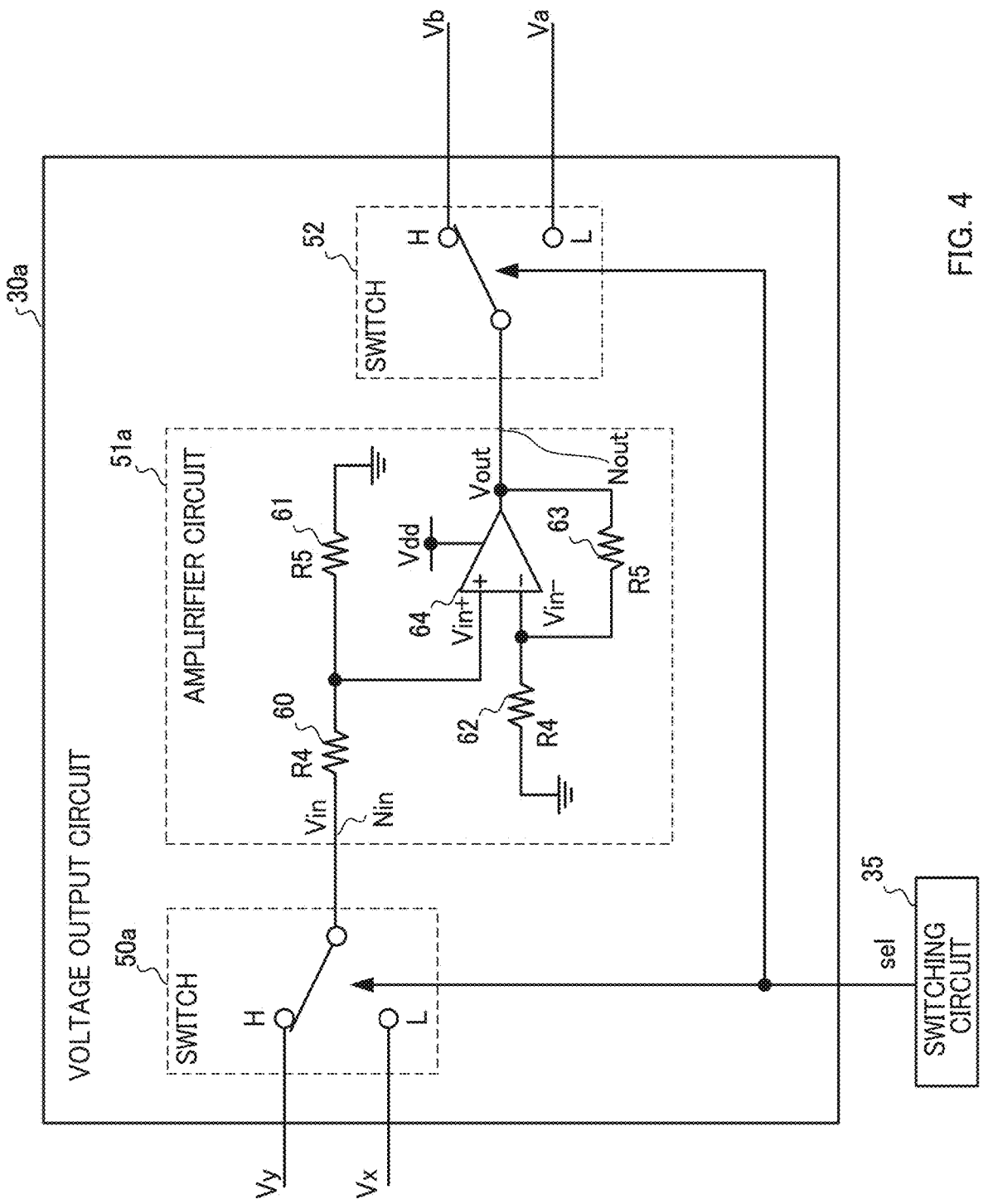

The voltage output circuit 30a amplifies each of the voltages Vx and Vy, to thereby output a resultant voltage as voltage Va, Vb. Specifically, the voltage output circuit 30a amplifies the voltage Vx at the node NX for the time period P0, to thereby output a resultant voltage to the capacitor 31, and amplifies the voltage Vy at the node NY for the time period P1, to thereby output a resultant voltage to the capacitor 32. As illustrated in FIG. 4, the voltage output circuit 30a includes switches 50a and 52 and an amplifier circuit 51a.

The switch 50a selects the voltage Vx or the voltage Vy to be outputted to the amplifier circuit 51a, based on the selection signal sel from the switching circuit 35 (described later). Specifically, the switch 50a selects the voltage Vx in response to the low signal sel, and selects the voltage Vy in response to the high signal sel. Note that the signal sel is low during the time period P0, and the signal sel is high during the period P1. Note that the switch 50a corresponds to a "first switch".

The amplifier circuit 51a configures a differential amplifier circuit that outputs a voltage resulting in the voltage Va, Vb to cause the voltage Vx and the voltage Vy to be equal, and amplifies the difference between the voltage outputted from the switch 50a and a ground voltage. Specifically, the amplifier circuit 51a amplifies the difference between a voltage Vin (that is, a selected voltage) at a node Nin that receives the voltage Vx or Vy selected by the switch 50a, and the ground voltage.

Further, the amplifier circuit 51a outputs, from a node Nout, the voltage resulting in the voltage Va or the voltage Vb, as a voltage Vout, based on the voltage Vx or the voltage Vy selected by the switch 50a. Furthermore, the amplifier circuit 51a includes resistors 60 to 63, and an operational amplifier 64.

The resistors 60 to 63 and the operational amplifier 64 configure a differential amplifier circuit that amplifies the difference between the voltage Vin and the ground voltage. A voltage Vin+ obtained by dividing the voltage Vin by the resistors 60 and 61 is applied to the non-inverting input of the operational amplifier 64. Further, a voltage Vin− according to the output voltage Vout of the operational amplifier 64 and ground voltage is applied to the inverting input of the operational amplifier 64 by the resistors 62 and 63.

Here, to explain the operation of the amplifier circuit 51a, the voltages Vin+ and Vin− are given as follows: Note that a description will be given here of the operation of the amplifier circuit 51a when the operational amplifier 64 is under an ideal condition of having no offset voltage.

$$Vin+=Vin \times R5/(R4+R5) \qquad \text{Expression (8),}$$

$$Vin-=Vout \times R4/(R4+R5) \qquad \text{Expression (9),}$$

where R4 is the resistance value of the resistor 60, 62, R5 is the resistance value of the resistor 61, 63, and Vin is the voltage at the node Nin.

Since Vin+=Vin− in terms of circuit configuration, the voltage Vout is as follows, and the amplifier circuit 51a operates as a differential amplifier circuit with gain G=R5/R4.

$$Vout = G \times Vin \qquad \text{Expression (10)}$$

From above, the amplifier circuit 51a outputs, as the voltage Vout, the voltage resulting in the voltage Va or the voltage Vb, based on the voltage Vx or the voltage Vy selected by the switch 50a. Note that the amplifier circuit 51a corresponds to a "second amplifier circuit," and the voltage Vout corresponds to a "result of amplification".

The switch 52 outputs, to the capacitor 31, the voltage Vout from the amplifier circuit 51a as the voltage Va for the time period P0, in response to the low signal sel, and outputs, to the capacitor 32, the voltage Vout from the amplifier circuit 51a as the voltage Vb for the time period P1, in response to the high signal sel. Note that the switch 52 corresponds to a "second switch".

Further, the voltage Va held by the capacitor 31 is applied to the non-inverting input of the operational amplifier 515, and the voltage Vb held by the capacitor 32 is applied to the inverting input of the operational amplifier 515. Further, in an embodiment of the present disclosure, a voltage Vc is defined as the output voltage of the operational amplifier 515. The capacitor 31 corresponds to a "first capacitor", and the capacitor 32 corresponds to a "second capacitor".

In an embodiment of the present disclosure, the voltage Va, Vb obtained by amplifying the voltage Vx, Vy is applied to the operational amplifier 515. However, if the voltage Vx, Vy smaller than the voltage Va, Vb is directly applied to the operational amplifier 515, the offset voltage Voff1 will have greatly influence as described above. As a result, in such a case, the operational amplifier 515 is unable to output the reference voltage Vbgr such that the voltages Vx and Vy will be equal with high accuracy.

Meanwhile, in an embodiment of the present disclosure, the voltage output circuit 30a amplifies the difference between the voltage Vx, Vy and the ground voltage, to thereby output a resultant voltage as the voltage Va, Vb. As a result, the operational amplifier 515 receives the voltage Va, Vb larger than the voltage Vx, Vy, thereby being able to reduce the effect of the offset voltage Voff1 of the operational amplifier 515.

Note that an offset voltage Voff2 may be generated in the operational amplifier 64 as well. Thus, the following describes, with reference to FIG. 5, how the effects of the respective offset voltages Voff1 and Voff2 are reduced in an embodiment of the present disclosure when the offset voltages Voff2 and Voff1 are generated in the operational amplifiers 64 and 515, respectively.

<<<Effects of Offset Voltages of Operational Amplifiers 64, 515>>>

Figure 5:
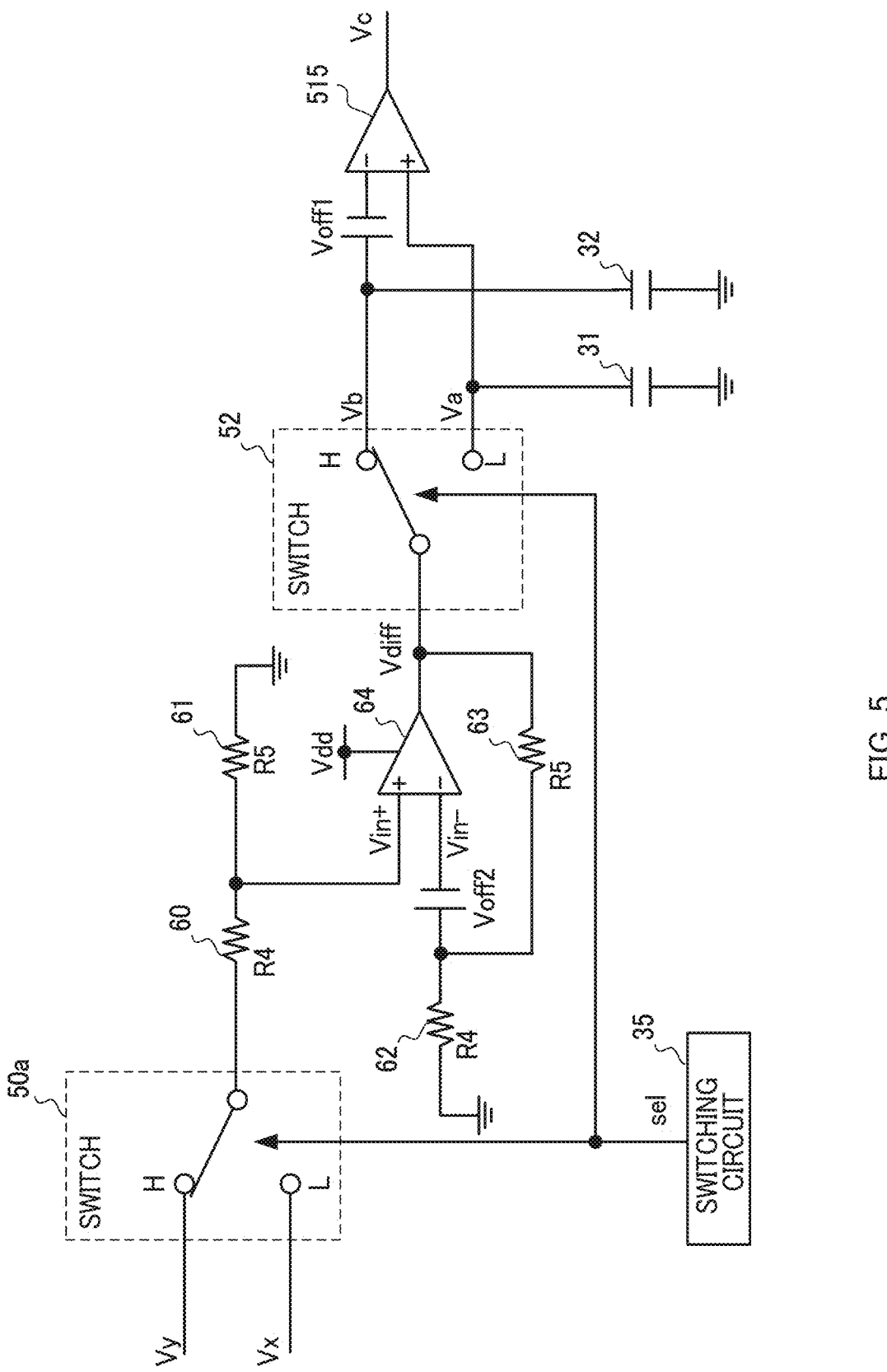
FIG. 5 is a diagram illustrating an operation of part of a reference voltage circuit 21.

FIG. 5 is a diagram for explaining offset voltages that the operational amplifiers 64 and 515 have. It is assumed here that the offset voltage of the operational amplifier 515 is the offset voltage Voff1, and is, as illustrated in FIG. 5, generated on the inverting input side of the operational amplifier 515. Similarly, it is assumed that the offset voltage of the operational amplifier 64 is the offset voltage Voff2, and is, as illustrated in FIG. 5, generated on the inverting input side of the operational amplifier 64.

In such a case, when the offset voltage Voff2 is reflected in Expressions (8) to (10) described above, the following results are obtained.

$$Vin += Vin \times R5/(R4 + R5) \qquad \text{Expression (11)}$$

$$Vin -= Vout \times \left(R4/(R4 + R5)\right) - Voff2 \qquad \text{Expression (12)}$$

$$Vout = G \times Vin + (1+G) \times Voff2 \qquad \text{Expression (13)}$$

Accordingly, the voltages Va and Vb are obtained as follows.

$$Va = G \times Vx + (1 + G) \times Voff2 = \qquad \text{Expression (14)}$$
$$G \times Vbe0 + (1 + G) \times Voff2$$

$$Vb = G \times Vy + (1 + G) \times Voff2 = \qquad \text{Expression (15)}$$
$$G \times (Vbe1 + VR3) + (1 + G) \times Voff2$$

Further, considering the offset voltage Voff1 of the operational amplifier 515 gives Va=Vb−Voff1, and thus the following expression is given.

$$G \times Vbe0 + (1 + G) \times Voff2 = \qquad \text{Expression (16)}$$
$$G \times (Vbe1 + VR3) + (1 + G) \times Voff2 - Voff1$$

Further, when ΔVbe=Vbe0−Vbe1, the following expression holds.

$$VR3 = \Delta Vbe + (1/G) \times Voff1 \qquad \text{Expression (17)}$$

Further, from Expressions (4) and (17), the reference voltage Vbgr is given as follows.

$$Vbgr = Vbe1 + \Delta Vbe \times (R2/R3 + 1) + \qquad \text{Expression (18)}$$
$$(1/G) \times Voff1 \times (R2/R3 + 1)$$

Accordingly, the effect of the offset voltage Voff2 of the amplifier circuit 51*a* is eliminated. This is because the voltage Va, Vb is outputted by the single amplifier circuit 51*a*, and the offset voltage Voff2 affects both the voltage Va and the voltage Vb in the same way.

Further, when the gain G of the amplifier circuit 51*a* is sufficiently large, the reference voltage circuit 21 will output the reference voltage Vbgr with less error, even if the operational amplifier 515 has the offset voltage Voff1. Note that the operational amplifier 515 corresponds to a "first amplifier circuit".

<<<Low-Pass Filter 33>>>

The low-pass filter 33 in FIG. 3 is provided between the output of the operational amplifier 515 and the output of the reference voltage circuit 21, and stabilizes the voltage Vc, which varies in response to the signal sel, to thereby output a resultant voltage as the reference voltage Vbgr. Specifically, the low-pass filter 33 includes a resistor 40 connected between the output of the operational amplifier 515 and the output of the reference voltage circuit 21, and a capacitor 41 provided between the output of the reference voltage circuit 21 and the ground. Further, the cutoff frequency of the low-pass filter 33 is lower than a frequency corresponding to a predetermined period T (described later) of the signal sel. As a result, the stable reference voltage Vbgr is applied to the output of the reference voltage circuit 21. Note that the resistor 40 corresponds to a "fourth resistor", and the capacitor 41 corresponds to a "third capacitor".

<<Charging Circuit 34>>

The charging circuit 34 charges the capacitor 41 in the low-pass filter 33, in response to the power supply voltage Vcc being supplied to the reference voltage circuit 21. Specifically, the charging circuit 34 charges the capacitor 41 with a charge current Ichg for a predetermined time period P from when the power supply voltage Vcc starts being supplied. Thereafter, the charging circuit 34 stops supplying the charge current Ichg to the capacitor 41.

Figure 6:
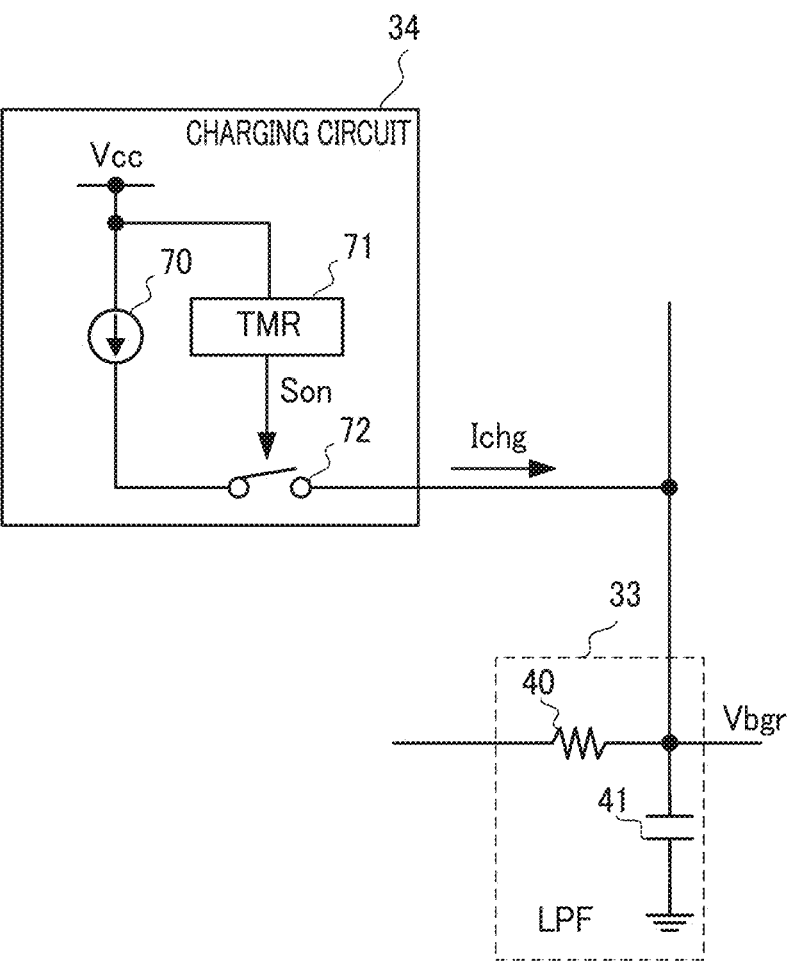
FIG. 6 is a diagram illustrating a configuration example of a charging circuit 34.

FIG. 6 is a diagram illustrating a configuration example of the charging circuit 34. The charging circuit 34 includes a current source 70, a timer (TMR) 71, and a switch 72. The current source 70 supplies the charge current Ichg. Upon receipt of the power supply voltage Vcc, the timer 71 outputs a signal Son to turn on the switch 72 for the predetermined time period P. The timer 71 outputs the signal Son to turn off the switch 72 after a lapse of the predetermined period P.

Figure 7:
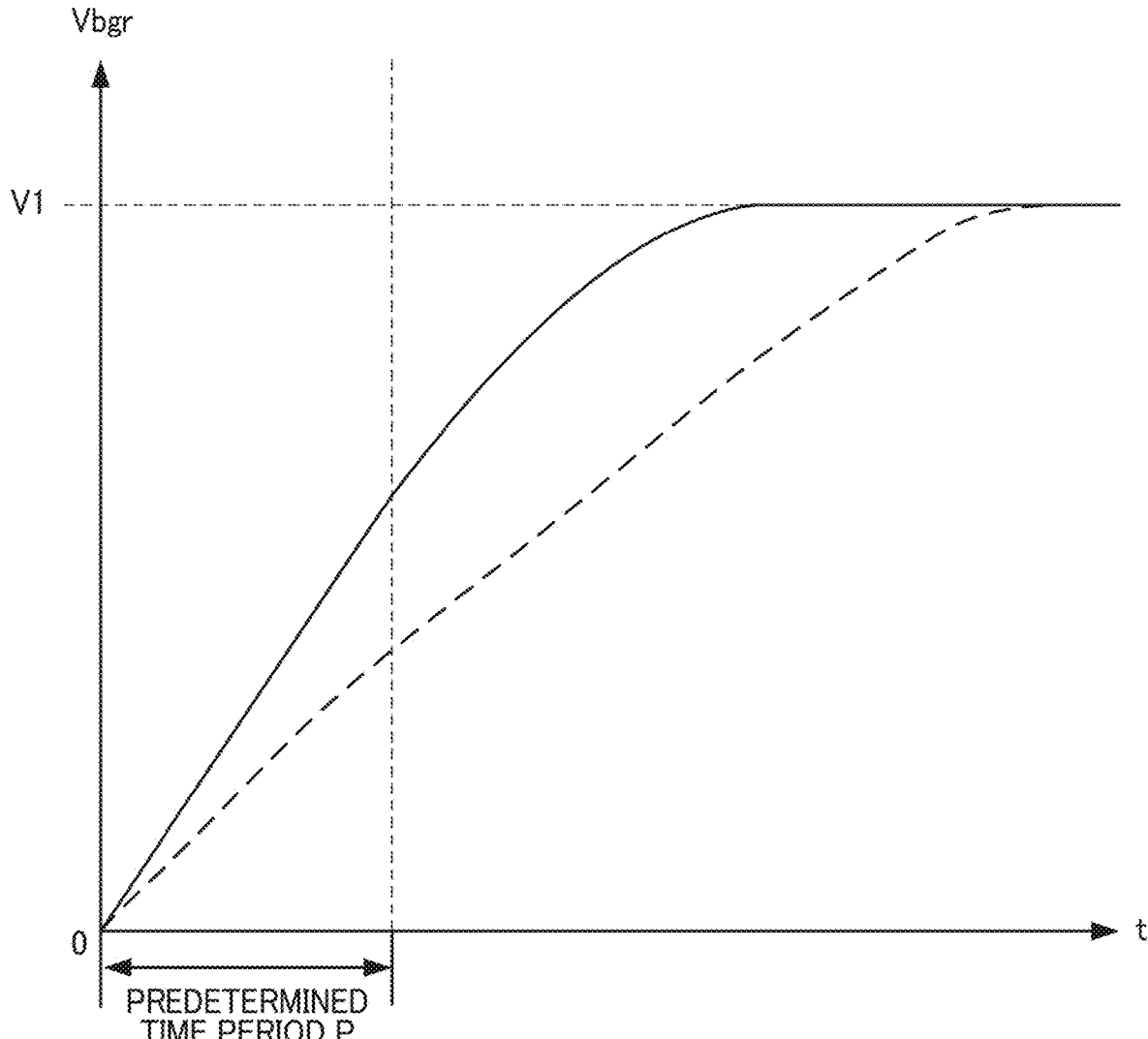
FIG. 7 is a diagram illustrating an example of an operation of a charging circuit 34.

FIG. 7 is a diagram illustrating an example of an operation of the charging circuit 34. The charging circuit 34 charges the capacitor 41 with the charge current Ichg for the predetermined time period P from time t=0 at which the supply of the power supply voltage Vcc starts, as given by a solid line. Thereafter, the charging circuit 34 stops supplying the charge current Ichg to the capacitor 41, and the reference voltage circuit 21 operates so as to apply the reference voltage Vbgr to the line LN. Accordingly, the charging circuit 34 reduces the rise time of the reference voltage Vbgr shorter than the rise time of the reference voltage Vbgr without the charging circuit 34, which is given by a broken line.

Note that the voltage level V1 is the voltage level of the reference voltage Vbgr after the reference voltage circuit 21 outputs the reference voltage Vbgr stably. Further, the predetermined time period P is determined such that the voltage level of the voltage at the capacitor 41 will not exceed the voltage level V1, even if the charging circuit 34 charges the capacitor 41 for the predetermined time period P.

<<Switching Circuit 35>>

The switching circuit 35 in FIG. 3 outputs the signal sel to select, from the voltages Vx and Vy, a voltage to be amplified by the output circuit 30a. Specifically, the switching circuit 35 outputs the signal sel so as to repeat the predetermined period T, during which the low signal sel is outputted for the time period P0 and then the high signal sel is outputted for the predetermined time period P1.

Further, the frequency Ft corresponding to the predetermined period T is higher than the maximum frequency Fa in the operating frequencies of the circuits in the pressure detection circuit 20, and the switching circuit 35 switches each of the states of the switches 50a and 52. This can suppress the malfunction of the pressure detection circuit 20 caused by the noise generated in the reference voltage Vbgr. Note that the time period P0 corresponds to a "first time period", and the time period P1 corresponds to a "second time period".

===Comparison of Reference Voltages Vbgr Between Reference Voltage Circuits 500 and 21===

FIG. 8 is a table for comparing the reference voltages Vbgr between the reference voltage circuits 500 and 21. In FIG. 8, the PNP transistors 510 and 511, the resistors 512 to 514, and the operational amplifier 515 are common, and the gain G of the amplifier circuit 51a is a factor of six.

The reference voltage circuit 500 outputs the reference voltage Vbgr of 1.188 V when the offset voltage Voff1 is 0 V, and outputs the reference voltage Vbgr of 1.311 V when the offset voltage Voff1 is 10 mV.

Meanwhile, the reference voltage circuit 21 outputs the reference voltage Vbgr of 1.188 V that is the same as of the reference voltage circuit 500 when the offset voltage Voff1 is 0 V, and outputs the reference voltage Vbgr of 1.213 V when the offset voltage Voff1 is 10 mV.

Here, when checking the error caused by the both offset voltages, the error in the reference voltage circuit 500 is 123 mV, while the error in the reference voltage circuit 21 is 25 mV. It is seen that the error in the reference voltage circuit 21 is smaller than the error in the reference voltage circuit 500, due to the effect of the gain G of the amplifier circuit 51a.

===Modifications===

<<<Voltage Output Circuit 30b>>>

Figure 9:
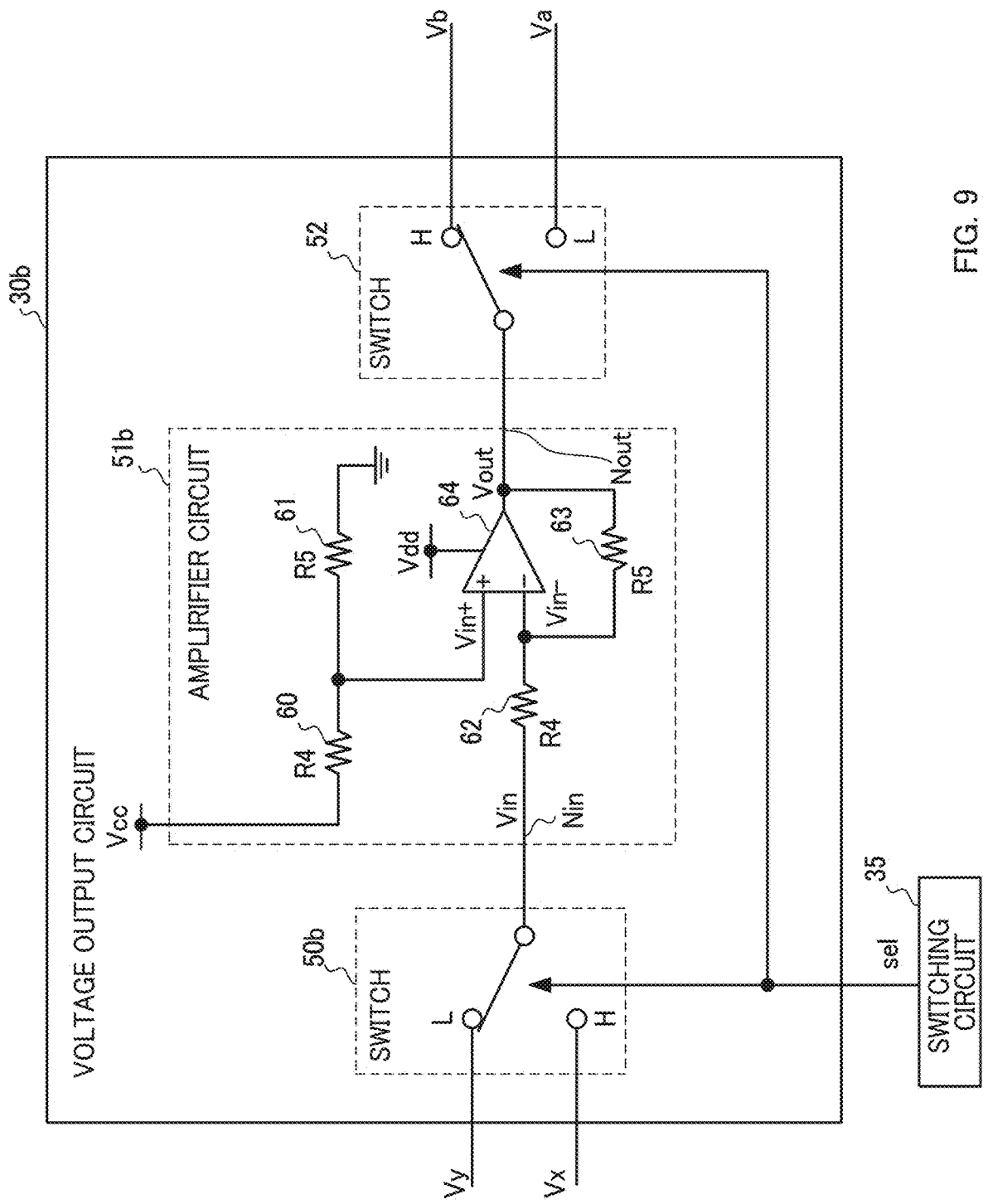
FIG. 9 is a diagram illustrating a configuration example of a voltage output circuit 30b.

FIG. 9 is a diagram illustrating a configuration example of a voltage output circuit 30b. The voltage output circuit 30b includes a switch 50b, the switch 52, and an amplifier circuit 51b.

The switch 50b selects the voltage Vx or the voltage Vy to be outputted to the amplifier circuit 51b, in response to the selection signal sel from the switching circuit 35 (described later). Specifically, the switch 50b selects the voltage Vx in response to the high signal sel, and selects the voltage Vy in response to the low signal sel.

The amplifier circuit 51b configures a differential amplifier circuit that outputs the voltage Va, Vb to cause the voltage Vx and the voltage Vy to be equal, and amplifies the difference between the voltage outputted from the switch 50b and the power supply voltage Vcc. Specifically, the amplifier circuit 51b amplifies the difference between the power supply voltage Vcc and the voltage Vin at the node Nin that receives the voltage Vx or Vy selected by the switch 50b.

The amplifier circuit 51b outputs, from the node Nout, a voltage resulting in the voltage Va or the voltage Vb based on the voltage Vx or voltage Vy selected by the switch 50b, as the voltage Vout. Further, the amplifier circuit 51b includes resistors 60 to 63, and the operational amplifier 64.

The resistors 60 to 63 and the operational amplifier 64 configure a differential amplifier circuit that amplifies the difference between the voltage Vin and the power supply voltage Vcc. The voltage Vin+ obtained by dividing the power supply voltage Vcc by the resistors 60 and 61 is applied to the non-inverting input of the operational amplifier 64. The voltage Vin– according to the voltage Vin and output voltage Vout of the operational amplifier 64 is applied to the inverting input of the operational amplifier 64 by the resistors 62 and 63.

Here, to explain the operation of the amplifier circuit 51b, the voltages Vin+ and Vin– are given as follows. Note here that a description will be given of the operation of the amplifier circuit 51b when the operational amplifier 64 is under ideal condition of having no offset voltage Voff2.

$$Vin += Vcc \times R5/(R4 + R5), \qquad \text{Expression (19)}$$

$$Vin -= (Vout - Vin) \times (R4/(R4 + R5)) + Vin, \qquad \text{Expression (20)}$$

where R4 is the resistance value of the resistor 60, 62, and R5 is the resistance value of the resistor 61, 63, and Vin is the voltage at the node Nin.

Then, since Vin+=Vin– in terms of circuit configuration, the voltage Vout is as follows, and the amplifier circuit 51b operates as the differential amplifier circuit with the gain G=R5/R4.

$$Vout = G \times (Vcc - Vin) \qquad \text{Expression (21)}$$

From above, the amplifier circuit 51b outputs, as the voltage Vout, a voltage resulting in the voltage Va or the voltage Vb, based on the voltage Vx or the voltage Vy selected by the switch 50b.

In this case, Expression (18) described above results in as follows.

$$Vbgr = Vbe1 + \Delta Vbe \times (R2/R3 + 1) - \qquad \text{Expression (22)}$$
$$(1/G) \times Voff1 \times (R2/R3 + 1)$$

Accordingly, in the amplifier circuit 51b as well, the effect of the offset voltage Voff2 is eliminated, and the reference voltage circuit 21 will output the reference voltage Vbgr with less error, that is, more accuracy, even if there is the offset voltage Voff1 in the operational amplifier 515, when the gain G of the amplifier circuit 51b is sufficiently large. Note that the amplifier circuit 51b corresponds to a "second amplifier circuit".

<<<Voltage Output Circuit 30c>>>

Figure 10:
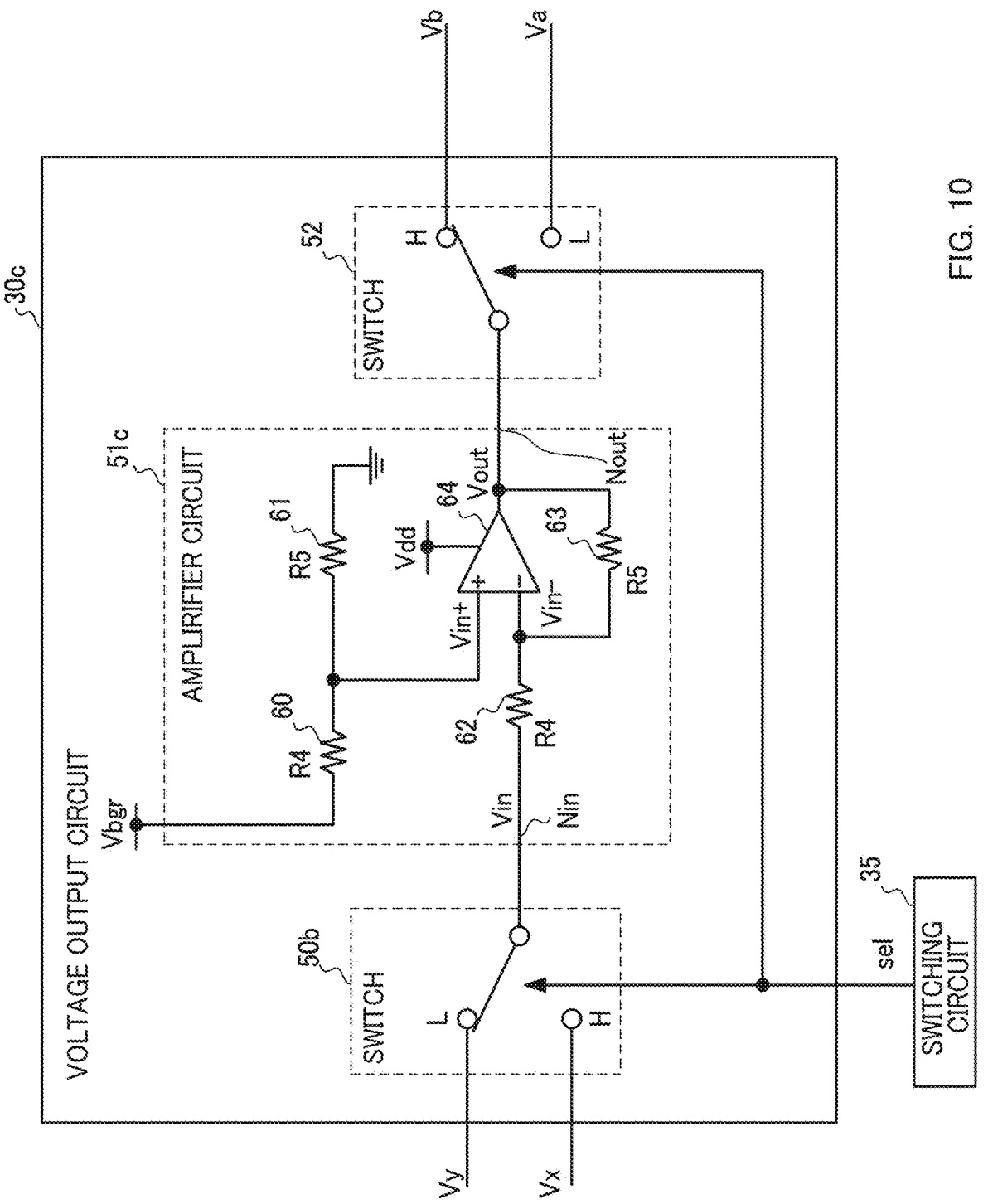
FIG. 10 is a diagram illustrating a configuration example of a voltage output circuit 30c.

FIG. 10 is a diagram illustrating a configuration example of a voltage output circuit 30c. The voltage output circuit 30c includes the switches 50b and 52 and an amplifier circuit 51c.

The amplifier circuit 51c configures a differential amplifier circuit that outputs a voltage resulting in the voltage Va, Vb to cause the voltage Vx and the voltage Vy to be equal, and amplifies the difference between the voltage outputted from the switch 50b and the reference voltage Vbgr. Specifically, the amplifier circuit 51c amplifies the difference between the voltage Vin at the node Nin that receives the voltage Vx or Vy selected by the switch 50b, and the reference voltage Vbgr.

The amplifier circuit 51c outputs, from the node Nout, a voltage resulting in the voltage Va or the voltage Vb, as the voltage Vout, based on the voltage Vx or the voltage Vy selected by the switch 50b. Further, the amplifier circuit 51c includes resistors 60 to 63, and the operational amplifier 64.

The resistors 60 to 63 and the operational amplifier 64 configure a differential amplifier circuit that amplifies the difference between the voltage Vin and the reference voltage Vbgr. The voltage Vin+ obtained by dividing the reference voltage Vbgr by the resistors 60 and 61, is applied to the non-inverting input of the operational amplifier 64. The voltage Vin-according to the voltage Vin and output voltage Vout of the operational amplifier 64 is applied to the inverting input of the operational amplifier 64 by the resistors 62 and 63.

Expressions (19) to (22) hold in the amplifier circuit 51c as well, if the power supply voltage Vcc is replaced with the reference voltage Vbgr.

Accordingly, in the amplifier circuit 51c as well, the effect of the offset voltage Voff2 is eliminated, and the reference voltage circuit 21 will output the reference voltage Vbgr, with less error, that is, more accuracy, even if there is the offset voltage Voff1 in the operational amplifier 515, when the gain G of the amplifier circuit 51c is sufficiently large.

<<Charging Circuit 36>>

It is assumed, as described above, that the charging circuit 34 charges the capacitor 41 with the charge current Ichg for the predetermined time period P from time t=0 at which the power supply voltage Vcc is supplied. Meanwhile, it may be assumed that the charging circuit 36, instead of the charging circuit 34, charges the capacitor 41 with the charge current Ichg from when the supply of the power supply voltage Vcc is started until when the voltage of the capacitor 41 reaches a voltage level V2 that is lower than the voltage level V1.

Figure 11:
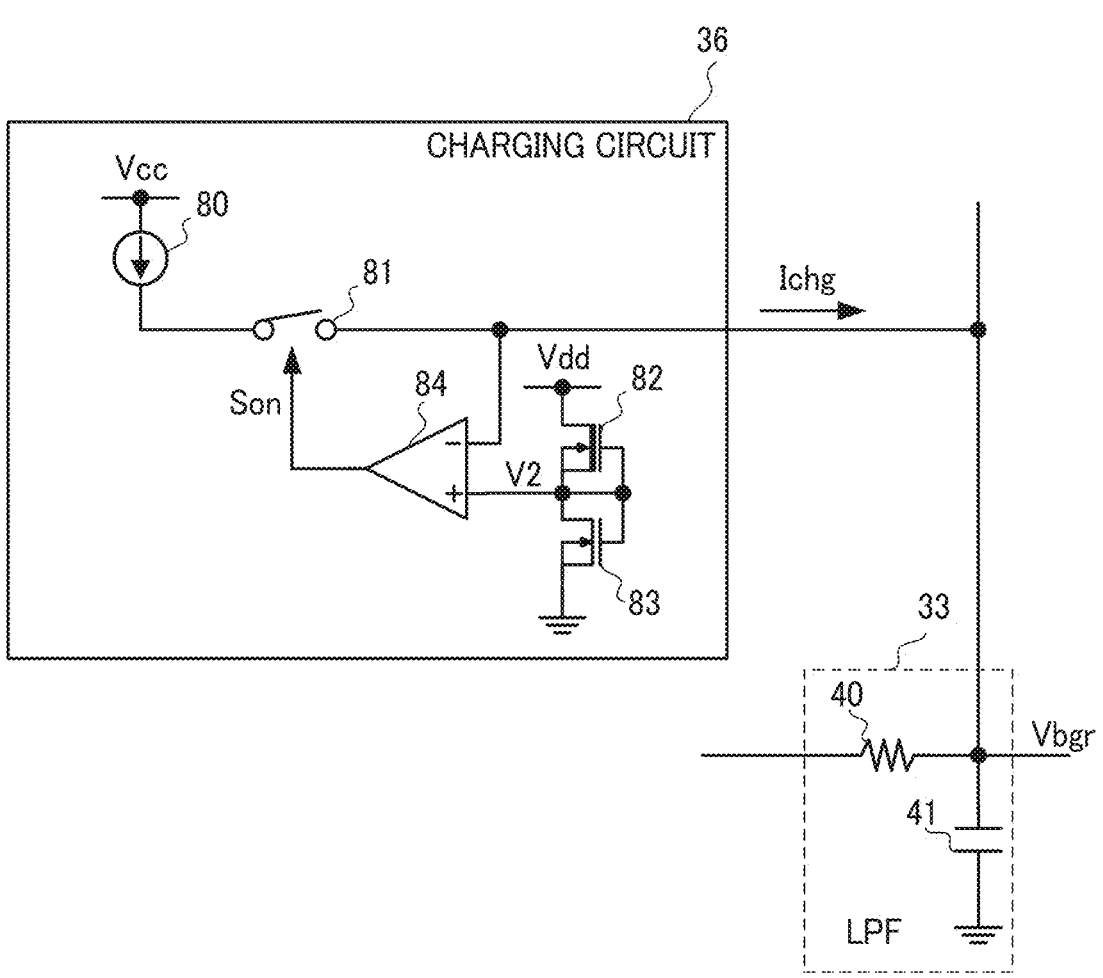
FIG. 11 is a diagram illustrating a configuration example of a charging circuit 36.

FIG. 11 is a diagram illustrating a configuration example of the charging circuit 36. The charging circuit 36 includes a current source 80, a switch 81, a depletion-type NMOS transistor 82, an enhancement-type NMOS transistor 83, and a comparator 84. The current source 80 supplies the charge current Ichg. The NMOS transistor 82 has a gate electrode and a source electrode that are connected, and operates as a current source that receives the voltage Vdd and passes a current through the NMOS transistor 83.

Further, the NMOS transistor 83 has a gate electrode and a drain electrode that are connected, that is, it is diode-connected. Then, in response to the current from the NMOS transistor 82 flowing through the NMOS transistor 83, the reference voltage V2 is outputted from the drain electrode of the NMOS transistor 83.

The comparator 84 determines whether the reference voltage Vbgr reaches the reference voltage V2, to thereby output the signal Son to control the switch 81. Specifically, the comparator 84 outputs the signal Son to turn on the switch 81 when the reference voltage Vbgr is lower than the reference voltage V2, and outputs the signal Son to turn off the switch 81 when the reference voltage Vbgr is higher than the reference voltage V2.

Figure 12:
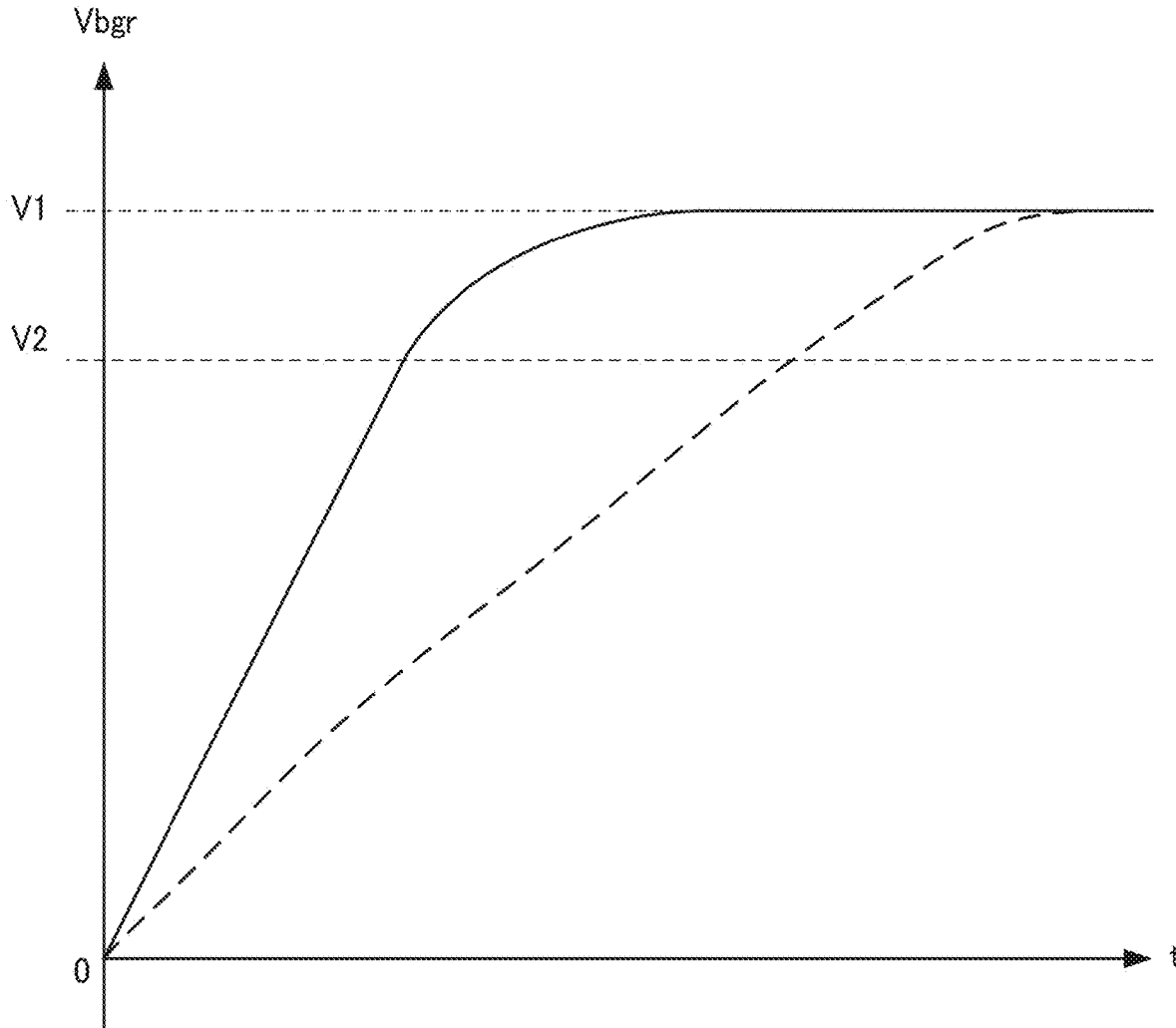
FIG. 12 is a diagram illustrating an example of an operation of a charging circuit 36.

FIG. 12 is a diagram illustrating an example of an operation of the charging circuit 36. The charging circuit 36 charges the capacitor 41 with the charge current Ichg from time t=0 at which the power supply voltage Vcc is supplied, until when the voltage at the capacitor 41 reaches the voltage level V2, which is lower than the voltage level V1, as given by a solid line. Thereafter, the charging circuit 34 stops supplying the charge current Ichg to the capacitor 41.

Even if operating as such, the charging circuit 36 reduces the rise time of the reference voltage Vbgr shorter than the rise time of the reference voltage Vbgr without the charging circuit 36, which is given by a dashed line. Note that the voltage level V1 is the voltage level of the reference voltage Vbgr after the reference voltage circuit 21 outputs the reference voltage Vbgr stably. The voltage level V2 corresponds to a "predetermined level".

SUMMARY

The electronic circuit 10 according to an embodiment of the present disclosure has been described above. The reference voltage circuit 21 includes the PNP transistors 510 and 511, the voltage output circuit 30a, and the operational amplifier 515. The voltage output circuit 30a amplifies each of the voltages Vx and Vy, to thereby output a resultant voltage as the voltage Va, Vb. This makes it possible to provide a reference voltage circuit capable of outputting a bandgap voltage with high accuracy.

Further, the voltage output circuit 30a also includes the switches 50a and 52 and the amplifier circuit 51a. The amplifier circuit 51a amplifies one of the voltage Vx or Vy selected by the switch 50a, to thereby output a resultant voltage as the voltage Va or Vb, Even if the offset voltage Voff2 is generated at the operational amplifier 64 in the amplifier circuit 51a, it affects both the voltages Va and Vb in the same way. Accordingly, even if there is the offset voltage Voff2 in the operational amplifier 64, it does not affect the reference voltage Vbgr outputted by the reference voltage circuit 21.

Further, the amplifier circuit 51a, 51b amplifies the difference between one of the voltage Vx or Vy and the ground voltage or the power supply voltage Vcc by a factor of the gain G, to thereby output a resultant voltage as the voltage Va, Vb. This makes it possible to reduce the error in the reference voltage Vbgr caused by the effect of the offset voltage Voff1, even if there is the offset voltage Voff1 in the operational amplifier 515.

Further, the reference voltage circuit 21 includes the switching circuit 35. This makes it possible to amplify both the voltages Vx and Vy to thereby output a resultant voltage as the voltage Va or Vb, with the amplifier circuit 51a alone.

Further, the reference voltage circuit 21 includes the low-pass filter 33. This results in the stable reference voltage Vbgr being applied to the output of the reference voltage circuit 21.

Further, the reference voltage circuit 21 includes the charging circuit 34. The low-pass filter 33 includes the resistor 40 and the capacitor 41, and the charging circuit 34 charges the capacitor 41 for the predetermined time period P, in response to the power supply voltage Vcc being supplied thereto. Accordingly, the charging circuit 34 reduces the rise time of the reference voltage Vbgr.

Further, the reference voltage circuit 21 includes the charging circuit 36. The low-pass filter 33 includes the resistor 40 and the capacitor 41, and the charging circuit 36 charges the capacitor 41 to the voltage level V2, in response to the power supply voltage Vcc being supplied thereto. Accordingly, the charging circuit 36 reduces the rise time of the reference voltage Vbgr.

Further, the PNP transistors 510 and 511 are diode-connected transistors. Diodes may be used instead of PNP transistors 510 and 511.

Further, the electronic circuit 10 includes the pressure detection circuit 20 and the reference voltage circuit 21, wherein the frequency Ft corresponding to the predetermined period T is higher than the maximum frequency Fa in the operating frequencies with which the circuits in the pressure detection circuit 20 operate. This can suppress the malfunction of the pressure detection circuit 20 caused by the noise generated in the reference voltage Vbgr.

The present disclosure is directed to provision of a reference pressure circuit capable of outputting a bandgap voltage with high accuracy According to the present disclosure, it is possible to provide a reference voltage circuit capable of outputting a band gap voltage with high accuracy.

An embodiment of the present disclosure described above is simply to facilitate understanding of the present disclosure and is not in any way to be construed as limiting the present disclosure. The present disclosure may variously be changed or altered without departing from its essential features and encompass equivalents thereof.

What is claimed is:

1. A reference voltage circuit for generating a reference voltage, comprising:

a predetermined line;

a first resistor and a first pn junction device that are provided between the predetermined line and a ground, the first pn junction device being connected in series with the first resistor;

a second resistor, a third resistor, and a second pn junction device that are provided between the predetermined line and the ground, the third resistor being connected in series with the second resistor, the second pn junction device being connected in series with the third resistor;

a first capacitor and a second capacitor;

a voltage output circuit configured to operate repeatedly with a predetermined frequency, which corresponds to a predetermined period that includes a first time period and a second time period, by amplifying a first voltage at a first node, at which the first resistor and the first pn junction device are connected, for the first time period, to thereby output a first resultant voltage to the first capacitor, and amplifying a second voltage at a second node, at which the second resistor and the third resistor are connected, for the second time period, to thereby output a second resultant voltage to the second capacitor; and a first amplifier circuit configured to amplify a difference between a voltage at the first capacitor and a voltage at the second capacitor, wherein the reference voltage is generated corresponding to a voltage outputted by the first amplifier circuit, and is applied to the predetermined line.

2. The reference voltage circuit according to claim 1, wherein the voltage output circuit includes a first switch configured to select a voltage that is
the first voltage for the first time period, and
the second voltage for the second time period, a second amplifier circuit configured to amplify the selected voltage, and a second switch configured to
output a result of amplification of the second amplifier circuit to the first capacitor, for the first time period, and
output the result of amplification to the second capacitor, for the second time period.

3. The reference voltage circuit according to claim 2, wherein the second amplifier circuit amplifies a difference between the selected voltage and, a predetermined power supply voltage or a ground voltage.

4. The reference voltage circuit according to claim 3, further comprising: a switching circuit configured to control each of the first switch and the second switch.

5. The reference voltage circuit according to claim 1, further comprising:

a low-pass filter provided between an output of the first amplifier circuit and the predetermined line, wherein a cutoff frequency of the low-pass filter is lower than the predetermined frequency.

6. The reference voltage circuit according to claim 5, further comprising:

a charging circuit, wherein the low-pass filter includes a fourth resistor and a third capacitor, and the charging circuit receives a power supply, and charges the third capacitor for a predetermined time in response to the power supply.

7. The reference voltage circuit according to claim 5, further comprising:

a charging circuit, wherein the low-pass filter includes a fourth resistor and a third capacitor, and the charging circuit receives a power supply, and charges the third capacitor to a predetermined level that is lower than a level of the reference voltage, in response to the power supply.

8. The reference voltage circuit according to claim 1, wherein the first pn junction device and the second pn junction device are diode-connected transistors.

9. An electronic circuit comprising:

the reference voltage circuit according to claim 1; and another circuit configured to operate based on the reference voltage, wherein the predetermined frequency is set to be higher than an operating frequency of said another circuit.

* * * * *